United States Patent [19]

Satoh et al.

[11] Patent Number: 4,812,936
[45] Date of Patent: Mar. 14, 1989

[54] CASSETTE HAVING MAGNETIC TAPE PROTECTED FROM CONTAMINANTS

[75] Inventors: Takateru Satoh; Haruo Shiba, both of Nagano, Japan

[73] Assignee: TDK Corporation, Japan

[21] Appl. No.: 806,095

[22] Filed: Dec. 6, 1985

[30] Foreign Application Priority Data

Dec. 7, 1984 [JP] Japan .................. 59-185895

[51] Int. Cl.⁴ .......................................... G11B 23/087
[52] U.S. Cl. .................................... 360/132; 206/387
[58] Field of Search ............... 360/132; 242/198, 199; 206/387

[56] References Cited

U.S. PATENT DOCUMENTS

| 4,173,319 | 11/1979 | Umeda ............................ 360/132 |
| 4,422,550 | 12/1983 | Okamura ......................... 206/387 |
| 4,634,020 | 1/1987  | Beyersbergen van Henegouwen et al. ........................................... 360/132 |

FOREIGN PATENT DOCUMENTS

| 13373 | 1/1985 | Japan ............................. 360/132 |
| 60-109080 | 6/1985 | Japan ............................. 360/132 |

Primary Examiner—John H. Wolff
Assistant Examiner—Matthew J. Bussan
Attorney, Agent, or Firm—Steinberg & Raskin

[57] ABSTRACT

In a magnetic tape cassette having a housing and a cover mounted thereon, contaminants are prevented from passing into the housing interior at the point where the cover is mounted on the cassette, and thereby prevented from reaching the magnetic tape mounted in the interior of the housing. This is attained by partitioning an interior of the housing adjacent a wall portion thereof, into an outer contaminant-receiving compartment at which the cover is pivotally mounted, and an inner tape-receiving compartment. The partition prevents any communication between these two respective compartments.

17 Claims, 4 Drawing Sheets

CASSETTE HAVING MAGNETIC TAPE PROTECTED FROM CONTAMINANTS

BACKGROUND OF THE INVENTION

1. Field of the Invention

The present invention generally relates to a tape cassette of the type used for electromagnetically recording digital signals on magnetic tape and, more particularly, to protecting such magnetic tape from contaminants which may enter the cassette and compromise tape performance.

2. Description of the Prior Art

It is well known in the prior art to record analog signals on magnetic tape housed in a cassette which is insertable into a conventional recording/playback apparatus having a magnetic head which reads the analog signals and converts the same into sound and/or video output signals. It is also well known to record digital signals on so-called "floppy discs" having an opening which is accessed by the magnetic head. Although generally satisfactory for their intended purpose, there are problems associated with the use of floppy discs. For example, a user, through inadvertence, inexperience or deliberate action, may roughly handle the disc and touch the playing surfaces of the disc through the aforementioned access opening. The user may thus leave his fingerprints, outlined by oil, grease and water deposits, on the playing surfaces. Dust, dirt and other contaminants may enter via the access opening to adhere to the playing surfaces of the disc and, of course, such contaminants are particularly attracted to the fingerprint-marked areas. Such contaminants, of course, compromise tape performance. In addition, the non-rigid nature of the highly flexible floppy discs renders their handling much more difficult and awkward, as compared to rigid discs.

In an attempt to resolve the problems associated with floppy discs, the prior art has recently proposed using a magnetic tape cassette of the type exemplified in FIGS. 4–7 for recording digital signals. This prior art cassette comprises an upper rectangular casing 1 and a lower rectangular casing 2, each molded of a synthetic resin plastic material, and both joined together to form a cassette housing having an open front side. A magnetic tape 3 is mounted in the interior of the housing for travel between a pair of rotary reels 4, 5. The magnetic tape 3 is wound around the reel 4 and is sequentially advanced past a guide roller 6, a tape pad 7, another guide roller 8, and the other reel 5 in conventional manner. The tape 3 is advanced in a taut state past the open front side of the cassette housing during recording/playback operation.

It is also known to provide a protective cover 9 for covering the length of the magnetic tape 3 which is located at the front side of the cassette housing. The cover 9 is pivotably mounted on the housing for movement between an exposed position in which the cover 9 is remote from the tape at the front side of the housing, to a covered position in which the cover 9 overlies the tape at the front side of the housing. In the covered position, the cover 9 prevents dust, dirt and other contaminants, as well as the user's fingers, from entering the open front side of the housing and contacting the magnetic tape thereat. The aforementioned contaminant problem is very acute in the case of recording digital signals because the digital signals are recorded on much smaller lengths of the tape, as compared to recording analog signals. Put another way, the density of the digital signal is higher than that for the analog signal.

As shown in the enlarged views of FIGS. 6 and 7, the protective cover 9, which advantageously is made of a suitable resin material, has an elongated planar main portion extending along the length of the open front side of the housing, and a pair of arm portions 91 and 92 at opposite end regions of the main portion and extending perpendicularly thereof. A pair of stub shafts 93, 94 are connected on the arm portions and are colinearly arranged along a pivot axis around which the cover 9 pivots in either circumferential direction. The shafts 93, 94 are inserted into triangular bearing holes 10 which are formed in opposite side wall portions 101, 201 of the upper and lower casings 1 and 2, respectively. Each bearing hole 10 is formed by combining a pair of notches 102, 202 which are formed in abutting edges of the side wall portions 101, 201.

As shown in the covered position illustrated in FIG. 4, the conventional protective cover 9 covers a taut length of the magnetic tape 3 at the open front side of the cassette housing to close the cassette when the same is not in use. Consequently, there is no danger that the user's fingers and/or contaminants will contact the magnetic tape 3 and compromise the integrity and true reproduceability of the recorded digital signals. When the cassette is to be used, the protective cover 9 is first pivoted about the pivot axis to either the upper covered position shown in FIG.5 in which the main portion of the cover is located above the upper casing 1, or the lower covered position in which the main portion of the cover is located below the lower casing 2. Once the cover 9 is moved away from its overlying position with respect to the tape 3, then the cassette can be inserted into any recording/playback apparatus.

For the sake of completeness, it is noted that each of the reference numerals 11, 12 designates a tape end detecting hole into which is inserted a light-emitting element or a light-receiving element of the tape recording/playback apparatus. Each of the reference numerals 13, 14 designates a hole into which is inserted a capstan drive of the apparatus. The numeral 15 designates a shield plate.

Although the above described cassette with its protective cover has proven to be generally satisfactory for its intended purpose of protecting the tape at the front side of the housing from being contacted by finger and/or contaminants, the contaminant problem still remains. More particularly, experience has shown that, over the course of time, powder is produced and deposited on the tape within the cassette housing, thereby compromising tape performance. The powder is produced during the pivoting of the cover 9 among its various positions. The outer surfaces of the stub shafts 93 and 94 frictionally engage and, over time, grind down the inner surfaces of the bearing holes 10, thereby producing a ground powdery substance of synthetic resin material. The bearing holes 10, which extend through the side wall portions 101 and 201, serve as passages along which the thus-produced powder may enter the interior of the housing. The contaminant-entry problem is aggravated by the fact that the stub shafts 93, 94 are inserted from the exterior of the cassette housing through the side wall portions 101, 201 into the interior of the housing. The thus-introduced powder eventually deposits onto the magnetic tape and mars subsequent tape performance.

SUMMARY OF THE INVENTION

1. Objects of the Invention

It is a general object of the present invention to overcome the aforementioned drawbacks of the prior art.

It is another object of the invention to reliably prevent contaminants and/or fingers from contacting the magnetic tape mounted in the interior of a cassette housing.

It is a further object of the invention to prevent powder produced in the bearing holes for mounting a cover on the cassette from entering the interior thereof.

It is still another object of the invention to improve tape performance in a magnetic tape cassette of the type used for recording digital signals.

2. Features

In keeping with these objects, and others which will become apparent hereinafter, one feature of this invention resides, briefly stated, in a magnetic tape cassette which comprises a housing having wall portions bounding an interior and an open front side, and means for mounting magnetic tape in the interior of the housing for travel in a taut state past the front side of the housing during use of the cassette.

A protective cover is employed for protecting the taut magnetic tape at the front side of the housing. The cover is mounted on the housing by cover-mounting means which are operative for moving the cover between an exposed position in which the cover exposes the front side of the housing, and a protected position in which the cover overlies the front side of the housing. The cover-mounting means extend into the interior of the housing, and provides a passage along which contaminants may enter the interior of the housing.

In accordance with this invention, blocking means are provided in the interior of the housing. The blocking means are operative for preventing such contaminants from the passage from reaching and eventually contacting the magnetic tape mounted in the interior of the housing. Thus, tape performance is prevented from becoming degraded over the working lifetime of the cassette.

In a preferred embodiment, the cover-mounting means includes a pair of stub shafts mounted on the cover, and colinearly arranged along a pivot axis. The stub shafts are pivotably mounted in two openings extending through two wall portions of the housing. It is these two openings which serve as the passage along which contaminants generated by the aforementioned grinding action between the stub shafts and the openings may enter the interior of the housing.

The blocking means, in a preferred embodiment, may constitute a pair of partitions, each connected to the wall portions of the housing. The partitions subdivide the interior of the housing into a tape-receiving compartment in which the tape is received, and a contaminant-receiving compartment in which such contaminants are received. The partitions prevent communication between the tape-receiving compartment and a respective contaminant-receiving compartment.

Each partition is advantageously of one-piece molded construction with the housing. In the case where the housing has upper and lower casings connected together in an assembled condition, then each partition may advantageously include upper and lower partition portions respectively connected to the upper and lower casings and engaging each other in the assembled condition. In this case, each partition portion has a height corresponding to the height of side wall portions of each casing.

In another desirable embodiment of this invention, the blocking means may constitute a single partition connected to one of the upper and lower casings. This single partition may have a height which is twice that of side wall portions of either casing and engages the inner surface of the other of the casings in the assembled condition.

In either of the embodiments described above for the blocking means, each blocking means are desirably located at opposite end corner regions of the cassette housing which are located at opposite ends of the open front side of the housing.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
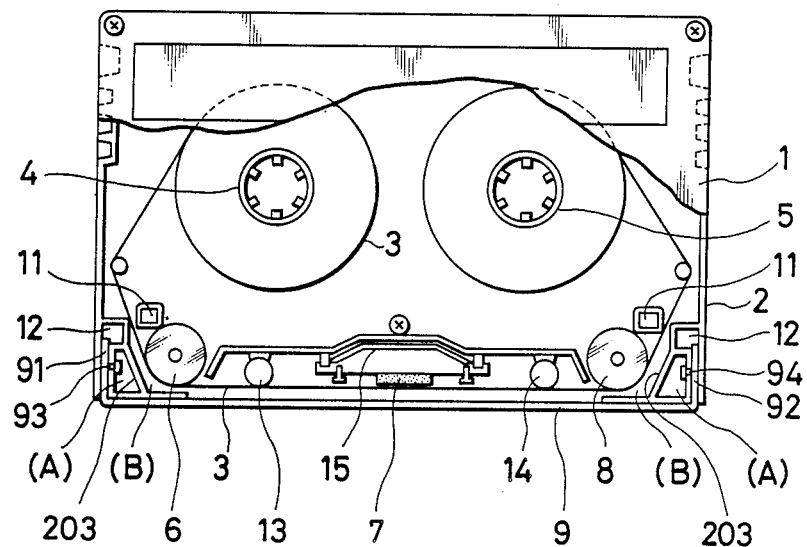
FIG. 1 is a partially broken-away top plan view of a magnetic tape cassette according to the present invention.
Figure 2:
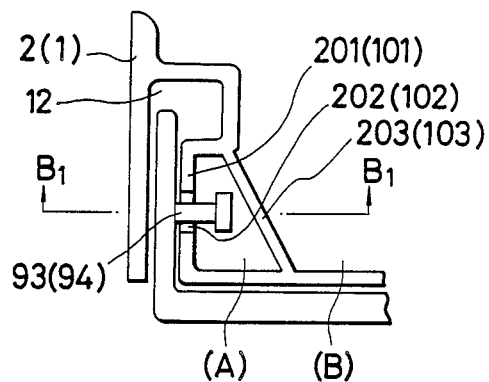
FIG. 2 is an enlarged broken-away top plan view of a front end corner region of the cassette of FIG. 1.
Figure 3:
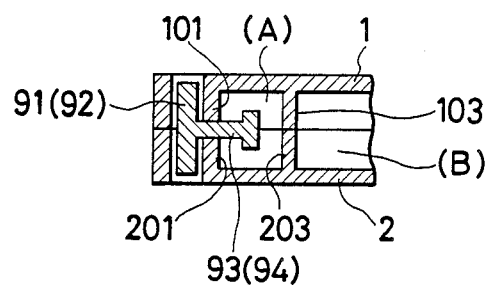
FIG. 3 is a sectional view taken along the line $B_1$—$B_1$ of FIG. 2.
Figure 4:
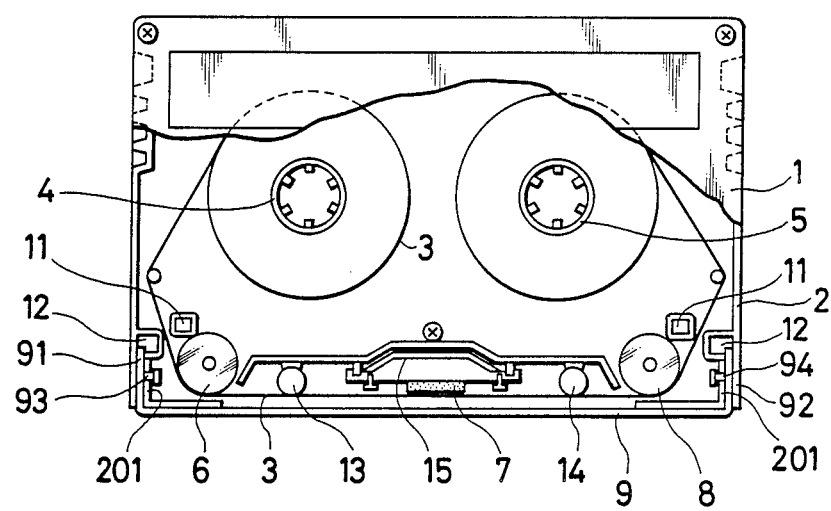
FIG. 4 is a partially broken-away top plan view of a conventional magnetic tape cassette according to the prior art.
Figure 5:
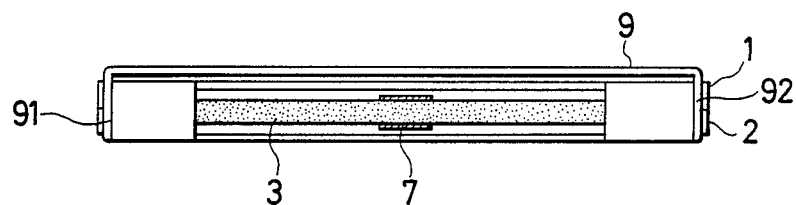
FIG. 5 is a front view of the prior art cassette shown in FIG. 4.
Figure 6:
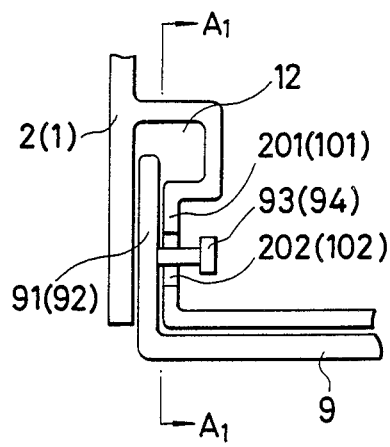
FIG. 6 is an enlarged broken-away top plan view of a front end corner region of the prior art cassette shown in FIG. 4.
Figure 7:
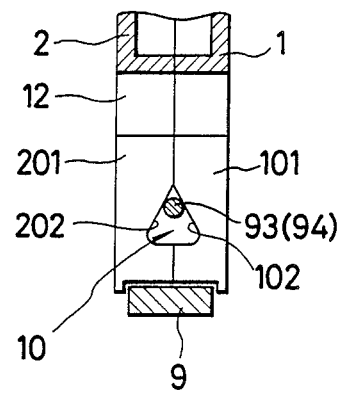
FIG. 7 is a sectional view taken along the line $A_1$—$A_1$ of FIG. 6.

Referring now to the invention as illustrated in FIGS. 1–3, like reference numerals have been employed to designate like parts as in the prior at cassette described above and illustrated in FIGS. 4–7 and, hence, a description of the structure and function of such like parts is not believed to be necessary and has been omitted for the sake of brevity.

In accordance with this invention, two blocking means 103, 203 are provided within the interior of the cassette housing for preventing contaminants from the bearing holes 10 from entering and contacting the magnetic tape 3 mounted in the interior of the housing. In a preferred embodiment, each blocking means may advantageously comprise a pair of partitions 103, 203 (see FIG. 3) connected to the upper casing 1 and lower casing 2, respectively. The height of each partition 103, 203 is the same as that of the side wall portions 101, 201, so that the lowermost surface of the partition 103 engages the uppermost surface of the partition 203 in the assembled condition of the housing. A first pair of partitions 103, 203 is provided at a left front end corner region of the cassette housing as viewed in FIG. 1, and a second pair of partitions 103, 203 is provided at the right front end corner region of the cassette housing.

Each pair of partitions subdivides the interior of the casing into a contaminant-receiving compartment A in which contaminants are received, and a tape-receiving compartment B in which the magnetic tape 3 is received. Each pair of partitions prevents communication between the tape-receiving compartment B and a respective contaminant-receiving compartment A.

Consequently, even if the outer surfaces of the stub shafts 93, 94 frictionally engage and grind down the walls bounding the bearing holes 10 and produce a powder inside the bearing holes, the two pairs of partitions 103, 203 effectively prevent the thus-produced powder from entering the tape-receiving compartment B and, in fact, collect the thus-produced powder within the contaminant-receiving compartments A. With this source of contamination eliminated, tape performance is not degraded over time.

It will be understood that each of the elements described above, or two or more together, also may find a useful application in other types of constructions differing from the types described above.

While the invention has been illustrated and described as embodied in a cassette having magnetic tape protected from contaminants, it is not intended to be limited to the details shown, since various modifications and structural changes may be made without departing in any way from the spirit of the present invention.

For example, rather than having a single pair of partitions 103, 203 at the right and left front corner end regions of the housing, two or more pairs of such partitions may be provided at each such corner end region. It is also possible to vary the height of the partitions in each pair. For example, rather than making the height of each partition equal to the height of the side wall portions 101, 201, the height of the partitions 103, 203 may be varied so long as their combined height equals the combined height of the side wall portions 101, 201; that is to say, the height of partition 203 may be greater than that of its correspondingly associated side wall portion 201, in which case, the height of partition 103 will be smaller than that of its correspondingly associated side wall portion 101.

Furthermore, it is also possible to constitute the blocking means provided at each front end corner region of the housing of a single partition connected to either the upper casing or the lower casing. In this case, the height of the partition 203 may equal the combined height of the side wall portions 101 and 201 and, in effect, the upper edge surface of the partition 203 frictionally engages the interior major surface of the upper casing 1. Conversely, the partition 103 may be made long enough so that its lower edge surface frictionally engages the inner major surface of the lower casing 2.

The partitions 103, 203 need not be linear, but can have any shape so long as each contaminant-receiving compartment A is isolated from the tape-receiving compartment B. As best shown in FIG. 2, the linear partition 203 extends from a corner of tape end detecting hole 12 to a front wall of the housing.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A magnetic tape cassette, comprising:
   (a) a housing having wall portions bounding an interior and an open front side;
   (b) means for mounting magnetic tape in the interior of the housing for travel in a taut state past the front side of the housing during use of the cassette;
   (c) a protective cover for protecting the taut magnetic tape at the front side of the housing;
   (d) cover mounting means for mounting the protective cover on the housing for movement between exposed and protected positions in which the cover respectively exposes and overlies the front side of the housing, said cover mounting means extending into the interior of the housing and providing a passage along which contaminants may enter the interior of the housing; and
   (e) blocking means in the interior of the housing for preventing contaminants from the passage from reaching the magnetic tape mounted in the interior of the housing;
   wherein the blocking means constitute a pair of partitions, each connected to the wall portions of the housing, and sub-dividing the interior of the housing into a tape-receiving compartment in which the tape is received, and a contaminant-receiving compartment in which contaminants are received, each partition preventing communication between the tape-receiving compartment and a respective contaminant-receiving compartment.

2. The cassette as defined in claim 1, wherein the cover mounting means include a pair of stub shafts mounted on the cover and colinearly arranged along a pivot axis, said stub shafts being pivotably mounted in two openings extending through two wall portions of the housing, and wherein the cover mounting means are operative for pivoting the protective cover about the pivot axis between said exposed and protected positions.

3. The cassette as defined in claim 2, wherein the cover has an elongated main portion extending along the front side of the housing, and a pair of arm portions at opposite end regions of the main portion, said stub shafts being mounted on the arm portions.

4. The cassette as defined in claim 1 wherein each partition is of one-piece construction with the housing.

5. The cassette as defined in claim 4, wherein the housing has upper and lower casings connected together in an assembled condition, and wherein each partition includes upper and lower partition portions respectively connected to the upper and lower casings and engaging each other in the assembled condition.

6. The cassette as defined in claim 5, wherein each partition portion has a height corresponding to the height of side wall portions of the housing.

7. The cassette as defined in claim 1 wherein the housing has upper and lower casings connected together in an assembled condition, and wherein each partition constitutes a single partition connected to one of said casings and engaging the other of said casings in the assembled condition.

8. The cassette as defined in claim 1, wherein the housing has two opposite corner regions at opposite ends of the front side, and wherein the blocking means includes a pair of partitions one at each corner region.

9. The cassette of claim 3, wherein said main portion of said cover forms a substantially right angle with each said arm portion, and each said partition extends as a hypotenuse with respect to said right angle when said cover is in said protected position.

10. The cassette of claim 3, wherein no component of said cassette is present within said contaminant-receiving compartment, except for said respective stub shaft.

11. The cassette of claim 3, wherein said wall portions each comprise a pair of branches at lateral sides of said cassette housing,
   each pair of branches defining one of a pair of tape-detecting holes,
   one of said branches in each pair comprising one of said openings for said respective stub shaft, and
   said arm portions of said cover each being positioned between a respective pair of branches and extending towards a respective one of said tape-detecting holes in the protected position.

12. The cassette of claim 1, wherein each said partition extends to the front side of said housing.

13. A magnetic tape cassette, comprising:
   (a) a housing having an upper casing and a lower casing connected together in an assembled condition and bounding an interior, said casings bounding an elongated open front side in the assembled condition and having side wall portions at opposite end regions of the front side;
   (b) means for mounting magnetic tape in the interior of the housing for travel in a taut state past the front side of the housing during use of the cassette;
   (c) a protective cover for protecting the taut magnetic tape at the front side of the housing, said cover having an elongated main portion and a pair of arm portions at opposite end regions of the main portion;
   (d) cover mounting means for mounting the protective cover on the housing for pivoting movement about a pivot axis between exposed and protected positions in which the main portion of the cover is remote from and overlies, respectively, the front side of the housing, said cover mounting means including a pair of stub shafts connected to the arm portions and colinearly arranged along the pivot axis, and a pair of openings in which the shafts are respectively received, said openings extending through the side wall portions from the exterior to the interior of the housing and providing a passage along which contaminants may enter the interior of the housing; and
   (e) blocking means in the interior of the housing for preventing contaminants from the passage from reaching the magnetic tape mounted in the interior of the housing, said blocking means constituting a pair of partitions connected to the housing and operative for subdividing the interior of the housing into a tape-receiving compartment in which the tape is received, and a contaminant-receiving compartment in which contaminants are received, each partition preventing communication between the tape-receiving compartment and a respective contaminant-receiving compartment.

14. The cassette of claim 13, wherein said main portion of said cover forms a substantially right angle with each said arm portion, and each said partition extends as a hypotenuse with respect to said right angle when said cover is in said protected position.

15. The cassette of claim 13, wherein no component of said cassette is present within said contaminant-receiving compartment, except for said respective stub shaft.

16. The cassette of claim 13, wherein said wall portions each comprise a pair of branches at lateral sides of said cassette housing,
   each pair of branches defining one of a pair of tape-detecting holes,
   one of said branches in each pair comprising one of said openings for said respective stub shaft, and
   said arm portions of said cover each being positioned between a respective pair of branches and extending towards a respective one of said detecting holes in the protected position.

17. The cassette of claim 13, wherein each said partition extends to the front side of said housing.

* * * * *